(12) United States Patent
Noma et al.

(10) Patent No.: US 7,305,001 B2
(45) Date of Patent: Dec. 4, 2007

(54) ADSL MODEM APPARATUS AND ADSL MODEM COMMUNICATION METHOD

(75) Inventors: Nobuhiko Noma, Yokohama (JP); Tatsuo Imai, Chigasaki (JP); Keiichi Tomita, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 916 days.

(21) Appl. No.: 10/423,933

(22) Filed: Apr. 28, 2003

(65) Prior Publication Data

US 2004/0022270 A1 Feb. 5, 2004

(30) Foreign Application Priority Data

Aug. 2, 2002 (JP) ............................ 2002-226537

(51) Int. Cl.
*H04L 12/28* (2006.01)
(52) U.S. Cl. ...................................... 370/402; 375/222
(58) Field of Classification Search ................ 370/401, 370/437, 480, 482, 485, 486, 402, 395.31, 370/431, 464, 465; 375/222, 395, 260, 316, 375/229, 235, 285
See application file for complete search history.

(56) References Cited

U.S. PATENT DOCUMENTS 5,838,667 A 11/1998 Bingham et al.
6,501,791 B1 * 12/2002 Hwang ........................ 375/222
2002/0008525 A1 1/2002 Seagraves et al.

FOREIGN PATENT DOCUMENTS

EP 1098463 5/2001
WO 02/11418 2/2002

OTHER PUBLICATIONS

ITU-T Series G: Transmission Systeam and Media, Digital Systeam and Networks, entitled Asymmetric Digital Subscriber Line (ADSL) Transceivers, which was published in Jun. 1999.
"G.hs.bis: G.vdsl and Implications to G.hs," ITU-Telecommunication Standardization Sector, Jul. 31, 2000, XP002203784, Online, retrieved from the Internet: URL:http://www.kiwin.com/xdsl/hc-074.pdf.
ITU-T Series G: Transmission System and Media, Digital Systems and Networks, entitled "Asymmetric Digital Subscriber Line (ADSL) Transceivers", XP002261882, which was published in Jun. 1999.

* cited by examiner

*Primary Examiner*—Brenda Pham
(74) *Attorney, Agent, or Firm*—Greenblum & Bernstein, P.L.C.

(57) ABSTRACT

The present invention provides a management table that uses only specific symbols for upstream signals and other symbols for downstream signals, within a hyperframe (ADSL communication unit). Communication is performed by switching streams between the upstream and downstream, in accordance with the symbols stored in the management table. Upon transmitting a predetermined number of hyperframes, a processor transmits a SEGUE signal instead of a REVERB signal in the beginning of the next hyperframe.

5 Claims, 18 Drawing Sheets

A48 is between #16-32

Fig.5 default

| carrier | PILOT | used stream |
|---------|-------|-------------|
| #0      |       | UP          |
| #1      |       | UP          |
| #2      |       | UP          |
|         |       | UP          |
| ⋮       |       | UP          |
|         |       | UP          |
|         |       | UP          |
|         |       | UP          |
| #31     |       | UP          |
| #32     |       | DOWN        |
| #33     |       | DOWN        |
|         |       | DOWN        |
| ⋮       |       | DOWN        |
| #48     | ○     | DOWN        |
|         |       | DOWN        |
| ⋮       |       | DOWN        |
| #64     | ○     | DOWN        |
| ⋮       |       | DOWN        |
| #255    |       | DOWN        |

Fig.6

| carrier | PILOT | used stream |
|---------|-------|-------------|
| #0      |       | UP          |
| #1      |       | UP          |
| #2      |       | UP          |
| .       |       | UP          |
| #15     |       | UP          |
| #16     | ○     | DOWN        |
| #17     |       | DOWN        |
| #18     | ○     | DOWN        |
|         |       | DOWN        |
| #32     | ○     | DOWN        |
| #33     |       | DOWN        |
|         |       | DOWN        |
| :       |       | DOWN        |
| #48     |       | DOWN        |
|         |       | DOWN        |
| :       |       | DOWN        |
| #64     |       | DOWN        |
| .       |       | DOWN        |
| #255    |       | DOWN        |

Fig.10

| carrier | used stream |
|---|---|
| #0 | UP |
| #1 | UP |
| #2 | UP |
|  | UP |
| ⋮ | UP |
|  | UP |
|  | UP |
|  | UP |
| #31 | UP |
| #32 |  |
| #33 |  |
| ⋮ |  |
| #48 |  |
| ⋮ |  |
| #64 |  |
| . |  |
| #255 |  |

Fig.11

| carrier | used stream |
|---|---|
| #0 | |
| #1 | |
| #2 | |
| ⋮ | |
| #7 | DOWN |
| | DOWN |
| #15 | DOWN |
| #16 | DOWN |
| #17 | DOWN |
| #18 | DOWN |
| | DOWN |
| #32 | DOWN |
| #33 | DOWN |
| ⋮ | DOWN |
| | DOWN |
| #48 | DOWN |
| | DOWN |
| ⋮ | DOWN |
| #64 | DOWN |
| · | DOWN |
| #255 | DOWN |

Fig. 13
| TTRc | | | | | | | | | | | |
|---|---|---|---|---|---|---|---|---|---|---|---|
| 0  | 0   | 1   | 2   | 3   | 4   | 5   | 6   | 7   | 8   | 9   | 10  |
| 1  | 11  | 12  | 13  | 14  | 15  | 16  | 17  | 18  | 19  | 20  | 21  |
| 2  | 22  | 23  | 24  | 25  | 26  | 27  | 28  | 29  | 30  | 31  |     |
| 3  | 32  | 33  | 34  | 35  | 36  | 37  | 38  | 39  | 40  | 41  | 42  |
| 4  | 43  | 44  | 45  | 46  | 47  | 48  | 49  | 50  | 51  | 52  | 53  |
| 5  | 54  | 55  | 56  | 57  | 58  | 59  | 60  | 61  | 62  | 63  | 64  |
| 6  | 65  | 66  | 67  | 68  | 69  | 70  | 71  | 72  | 73  | 74  |     |
| 7  | 75  | 76  | 77  | 78  | 79  | 80  | 81  | 82  | 83  | 84  | 85  |
| 8  | 86  | 87  | 88  | 89  | 90  | 91  | 92  | 93  | 94  | 95  | 96  |
| 9  | 97  | 98  | 99  | 100 | 101 | 102 | 103 | 104 | 105 | 106 | 107 |
| 10 | 108 | 109 | 110 | 111 | 112 | 113 | 114 | 115 | 116 | 117 | 118 |
| 11 | 119 | 120 | 121 | 122 | 123 | 124 | 125 | 126 | 127 | 128 |     |
| 12 | 129 | 130 | 131 | 132 | 133 | 134 | 135 | 136 | 137 | 138 | 139 |
| 13 | 140 | 141 | 142 | 143 | 144 | 145 | 146 | 147 | 148 | 149 | 150 |
| 14 | 151 | 152 | 153 | 154 | 155 | 156 | 157 | 158 | 159 | 160 | 161 |
| 15 | 162 | 163 | 164 | 165 | 166 | 167 | 168 | 169 | 170 | 171 | 172 |
| 16 | 173 | 174 | 175 | 176 | 177 | 178 | 179 | 180 | 181 | 182 |     |
| 17 | 183 | 184 | 185 | 186 | 187 | 188 | 189 | 190 | 191 | 192 | 193 |
| 18 | 194 | 195 | 196 | 197 | 198 | 199 | 200 | 201 | 202 | 203 | 204 |
| 19 | 205 | 206 | 207 | 208 | 209 | 210 | 211 | 212 | 213 | 214 | 215 |
| 20 | 216 | 217 | 218 | 219 | 220 | 221 | 222 | 223 | 224 | 225 |     |
| 21 | 226 | 227 | 228 | 229 | 230 | 231 | 232 | 233 | 234 | 235 | 236 |
| 22 | 237 | 238 | 239 | 240 | 241 | 242 | 243 | 244 | 245 | 246 | 247 |
| 23 | 248 | 249 | 250 | 251 | 252 | 253 | 254 | 255 | 256 | 257 | 258 |
| 24 | 259 | 260 | 261 | 262 | 263 | 264 | 265 | 266 | 267 | 268 | 269 |
| 25 | 270 | 271 | 272 | 273 | 274 | 275 | 276 | 277 | 278 | 279 |     |
| 26 | 280 | 281 | 282 | 283 | 284 | 285 | 286 | 287 | 288 | 289 | 290 |
| 27 | 291 | 292 | 293 | 294 | 295 | 296 | 297 | 298 | 299 | 300 | 301 |
| 28 | 302 | 303 | 304 | 305 | 306 | 307 | 308 | 309 | 310 | 311 | 312 |
| 29 | 313 | 314 | 315 | 316 | 317 | 318 | 319 | 320 | 321 | 322 |     |
| 30 | 323 | 324 | 325 | 326 | 327 | 328 | 329 | 330 | 331 | 332 | 333 |
| 31 | 334 | 335 | 336 | 337 | 338 | 339 | 340 | 341 | 342 | 343 | 344 |
 FEXT$_R$ symbol
 NEXT$_R$ symbol
T1535350-00

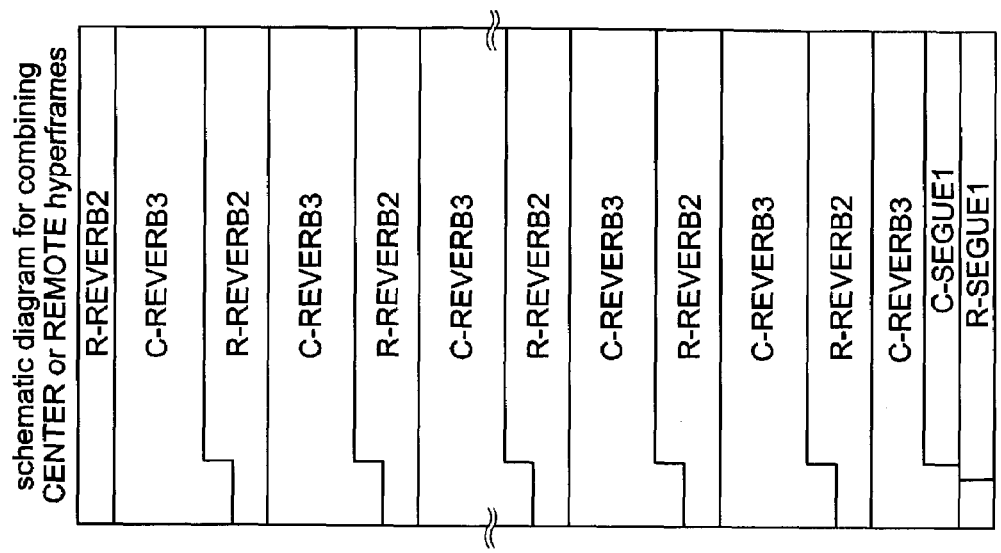
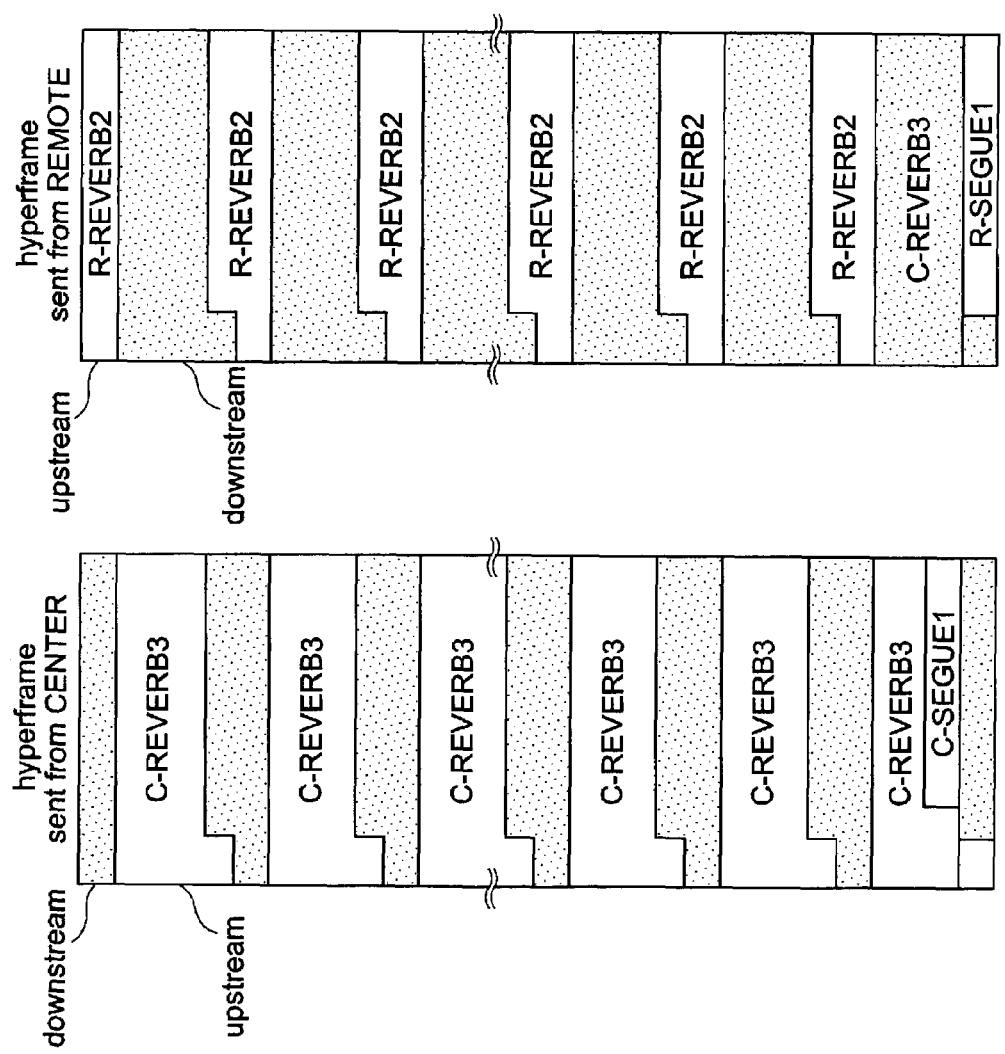

ADSL MODEM APPARATUS AND ADSL MODEM COMMUNICATION METHOD

BACKGROUND OF THE INVENTION

1. Field of the Invention

The present invention relates to an ADSL communication modem apparatus that adheres to the ITU-T recommended G.992.1 (hereafter referred to as G.dmt) and G.992.2 (hereafter referred to as G.lite), and an ADSL communication and an ADSL communication method that improve the above communication method.

2. Description of Related Art

During an ADSL communication based on ANNEX.C of G.hs/G.lite, carriers of carrier indexes #48 and #64 are used for a C-PILOT signal (C-PILOT1 signal or C-PILOT1A (accompanied pilot) signal), which are included in a downstream of an initialization sequence. This PILOT signal is used in order to establish a hyperframe synchronization at the remote side. When the center and remote sides establish both hyperframe synchronization and symbol synchronization, it is possible to accurately count and recognize each symbol for an important signal, and to execute communication sequences.

However, carrier frequencies (#48 and #64) assigned to the PILOT signal included in the downstream have a large attenuation amount during a long distance communication, due to their high frequencies, thereby preventing an adequate communication and hindering the realization of long distance ADSL communications.

SUMMARY OF THE INVENTION

The present invention addresses the above-described problems. The purpose of the invention is to provide an ADSL modem apparatus and an ADSL modem communication method that control attenuation of a PILOT signal within a range where the communication is capable and data is securely receivable at the reception side, even when the center and remote sides are far apart.

According to this invention, between the remote and center sides, a carrier index region used for the downstream is set at or below carrier index #32 whereas a carrier index region used for the upstream is set in a frequency range that is lower than the carrier frequency range used for the downstream.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates a relation between usable carrier indexes and PILOT signals for each of the upstream and downstream, based on the communication standard;

FIG. 6 illustrates a relation between usable carrier indexes and PILOT signals for each of the upstream and downstream, based on the original mode;

FIG. 10 illustrates a configuration of a management table indicating carrier numbers to be used by the upstream in the original mode, according to the second embodiment of the present invention;

FIG. 11 illustrates a configuration of a management table indicating carrier numbers to be used by the downstream in the original mode, according to the second embodiment of the present invention;

FIG. 13 illustrates alignment of FEXT and NEXT symbols of a hyperframe that is received at a remote side;

FIG. 14(a) illustrates a hyperframe transmitted from the center side, according to the second embodiment of the present invention;

FIG. 14(b) illustrates a hyperframe transmitted from the remote side, according to the second embodiment of the present invention;

FIG. 14(c) illustrates a schematic diagram combining the hyperframes of the center and remote sides, according to the second embodiment of the present invention;

DETAILED DESCRIPTION OF PREFERRED EMBODIMENTS

The embodiments of the present invention are explained in the following, in reference to the above-described drawings.

First Embodiment

Figure 1:
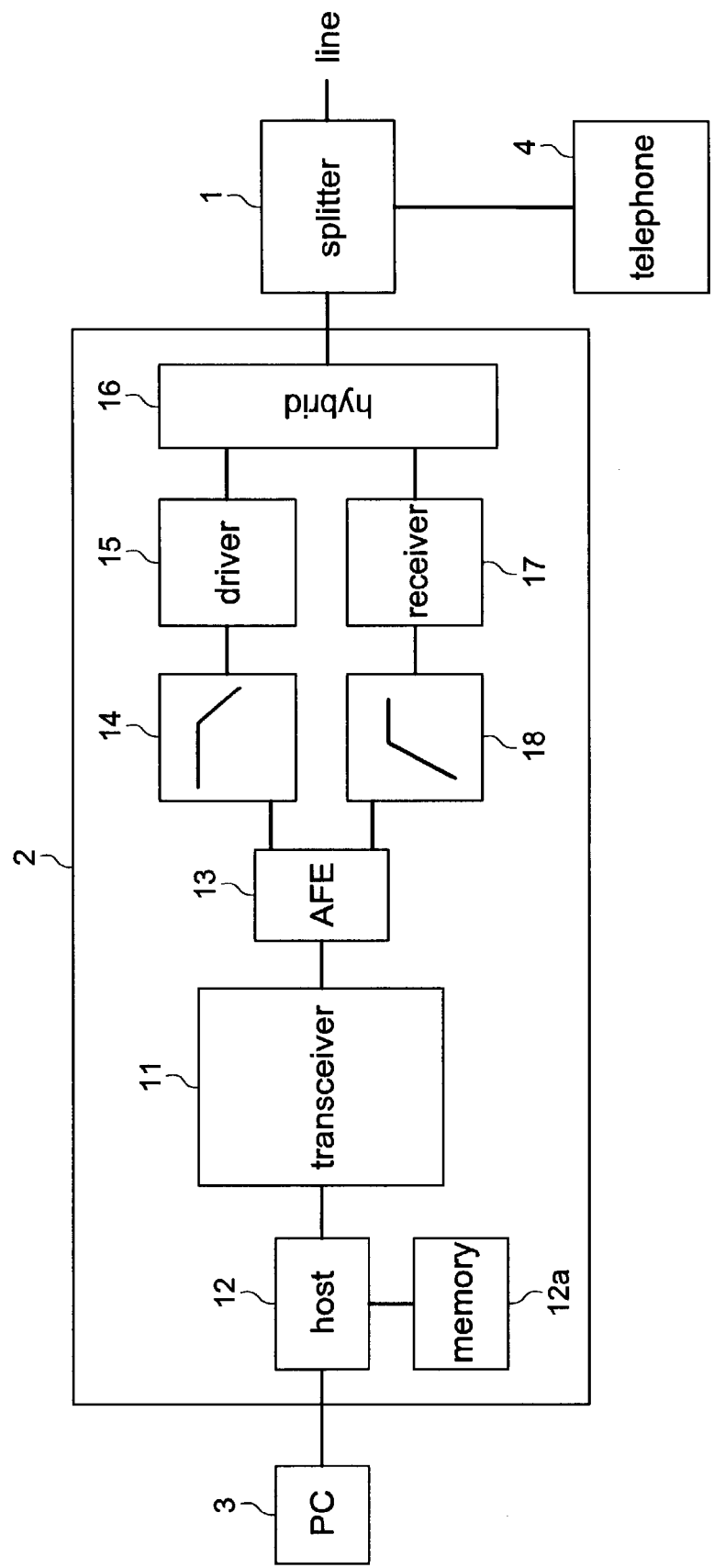
FIG. 1 illustrates a configuration of a remote side communication system according to an embodiment of the present invention.

FIG. 1 illustrates a diagram of a communication system at the ATU-R side according to the present invention. In the communication system as illustrated in FIG. 1, a public phone line or a similar phone line (hereafter referred to as line) is connected to ADSL communication apparatus 2 via splitter 1. Further, user terminal 3 is connected to ADSL communication apparatus 2. When user terminal 3 and telephone 4 share one line, splitter 1 is necessary. However, when telephone 4 is not used, splitter 1 is not needed. It is also possible to have a configuration where user terminal 3 internally installs ADSL communication apparatus 2.

ADSL communication apparatus 2 includes transceiver 11 that executes a handshake sequence and an initialization sequence (which will be later-described), and host 12 that controls the entire operation including the one of transceiver 11. At the line side of transceiver 11, units are configured with an analog circuit via an analog front end (hereafter referred to as AFE). Driver 15 is connected to a DA converter of AFE 13 via analog filter 14, so that an analog signal amplified by driver 15 is transmitted to the line via hybrid 16. The analog signal transmitted from the line is received by receiver 17 via hybrid 16, and then input into an AD converter of AFE 13 via analog filter 18. When sampling data is output from the AD converter, AFE 13 outputs the data to transceiver 11.

Figure 2:
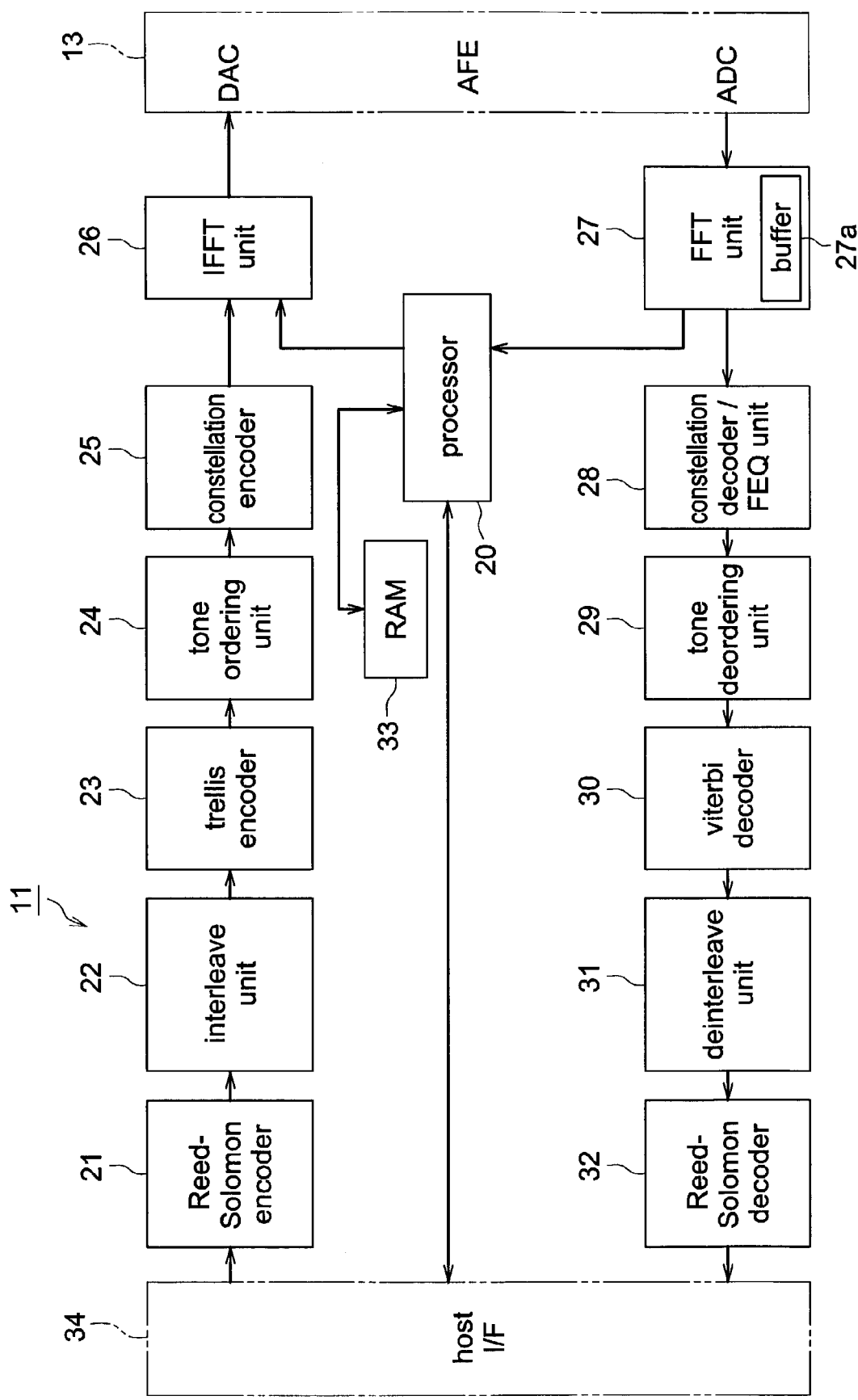
FIG. 2 is a functional block diagram of a transceiver of FIG. 1.

FIG. 2 is a functional block diagram illustrating transceiver 11. Processor 20 has a function to execute the handshake step and initialization step prior to initiating data transmission (SHOWTIME).

The transmission side of transceiver 11 includes Reed-Solomon encoder 21 that adds a redundancy bit for checking error, interleave unit 22 that sorts data to enable a burst error correction during Reed-Solomon decoding, Trellis encoder 23 that performs data convolution from a Trellis encoding, tone ordering unit 24 that lays out a bit number for each carrier, constellation encoder 25 that allocates topology of the transmission data on constellation coordinates, and IFFT unit 26 that performs an Inverse Fast Fourier Transform (hereafter referred to as IFFT) on data after the constellation encoding process.

The reception process side of transceiver 11 includes FFT unit 27 that performs a Fast Fourier Transform (hereafter referred to as FFT) on sampling data of the received signal, constellation decoder/FEQ unit 28 that decodes data from constellation data of the FFT output signal and corrects a topology on the constellation coordinates, tone de-ordering unit 29 that restores data laid out to each carrier after tone ordering process at the transmission side, Viterbi decoder 30 that performs Viterbi decoding on the received data, de-interleave unit 31 that restores data being resorted by the transmission side, and Reed-Solomon decoder 32 that deletes the redundancy bit added by the transmission side. Transceiver 11 is connected to host 12 via host interface (I/F) 34. RAM 33 is a work area of processor 20, which will be used for executing handshake and initialization sequences. In addition, RAM 33 includes a carrier table (later described). Transceiver 11 is connected to host 12 via host interface (I/F) 34.

An ADSL modem apparatus at the center side is connected to ADSL modem apparatus 2 via a metallic cable. The ADSL modem apparatus at the center side has the same configuration as ADSL communication apparatus 2. Telephone 4 is not included when the center side is an exchange set by a communication industry.

The following illustrates in detail an operation of the current embodiment with the above-described configuration, especially focusing on the operation for executing the initialization sequence. First, the initialization sequence based on G.hs is illustrated.

Figure 3:
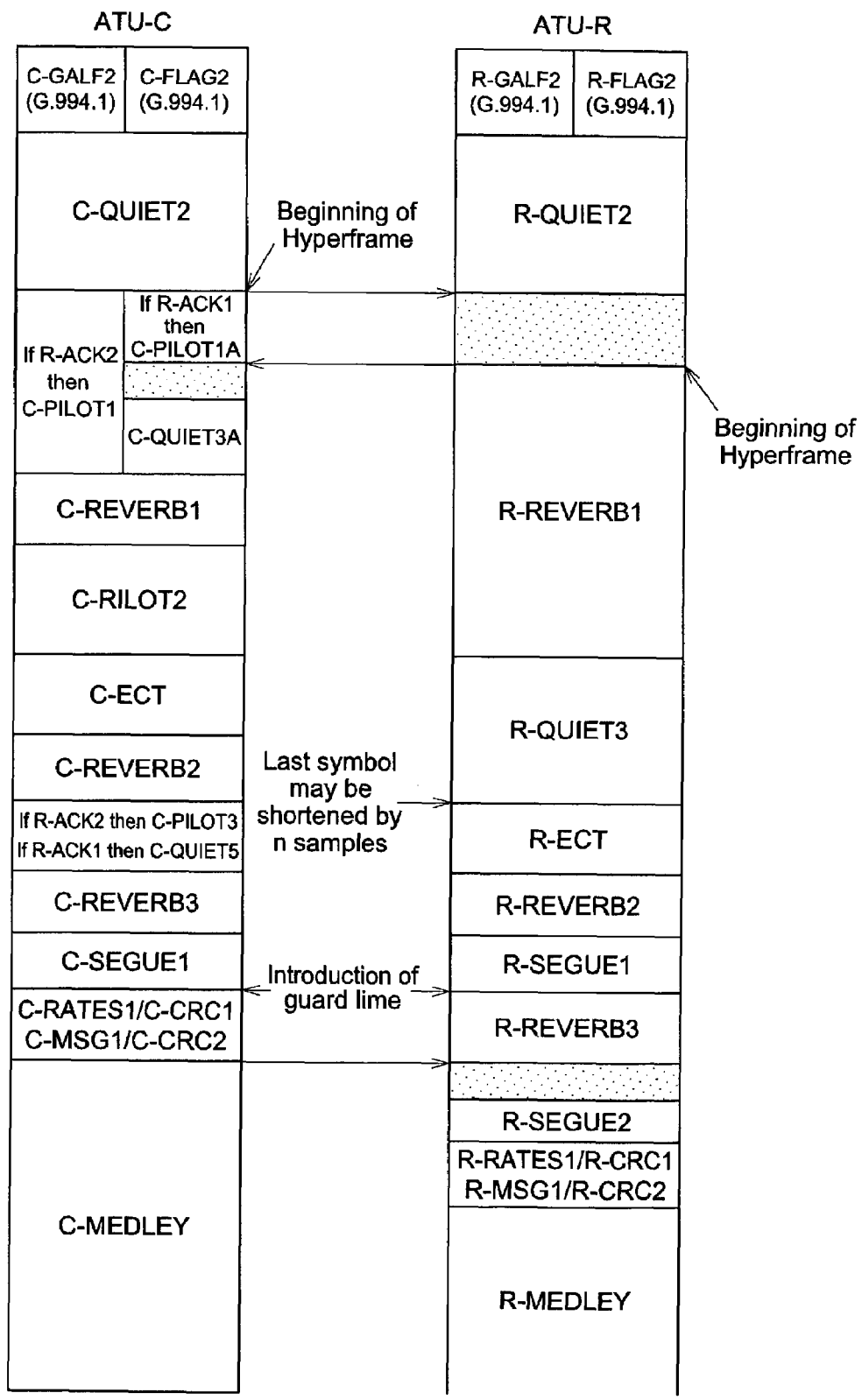
FIG. 3 is a first half of an initialization sequence set by ANNEX.C of G.dmt.

FIG. 3 illustrates the initialization sequence based on G.dmt. The ATU-C represents a center side, and the ATU-R represents a remote side. A handshake sequence based on G.994.1 is executed between the ATU-C and ATU-R to select a mode. Using the example in FIG. 3, G.dmt is selected as a mode for the initialization sequence.

Upon starting the initialization sequence, the ATU-C transmits C-PILOT1 or C-ILOT1A using carrier indexes #64 and #48.

When the initialization sequence is initiated and upon detecting a signal energy using carrier indexes #64 and #48, a process is performed to establish a hyperframe synchronization based on the PILOT signal. When the hyperframe synchronization is established, R-REVERB1 signal is transmitted.

Upon detecting R-REVERB1 signal, ATU-C transmits signals for a predetermined number of symbols in the order of C-REVERB1, C-PILOT2, C-ECT, and C-REVERB2.

Based on C-REVERB1 or C-REVERB2, the ATU-R performs a process to establish a symbol synchronization.

The ATU-C, upon transmitting C-REVERB3, transmits C-SEGUE1, and the ATU-R, upon transmitting R-REVERB2, transmits R-SEGUE1 at the same timing, for a plurality of symbols. Thereafter, since important signals that determine a parameter for the SHOWTIME are exchanged, cyclic-prefix data is added to each symbol. Various communication parameters are determined by exchanging a communication speed, encoding parameter, and tone ordering information via RATES and MSG signals having cyclic-prefixes. Although the explanation of the following sequence is omitted, upon mutually confirming the determined communication parameter, the SHOWTIME (data transmission) is executed.

Figure 4:
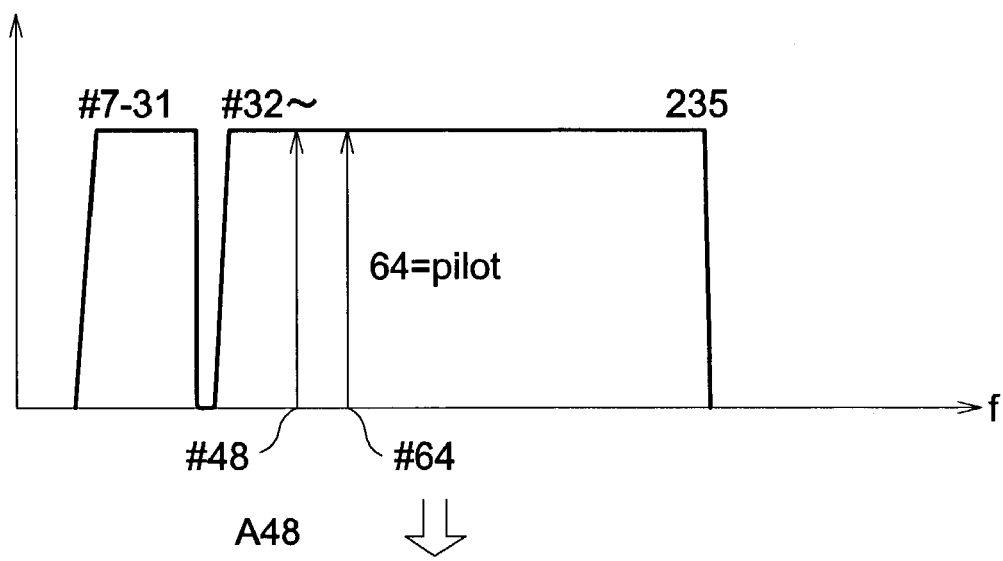
FIG. 4(a) illustrates a usable band (carrier index) for an upstream and a downstream based on a communication standard.
FIG. 4(b) illustrates a usable band (carrier index) for the upstream and downstream based on an original mode.
Figure 4:
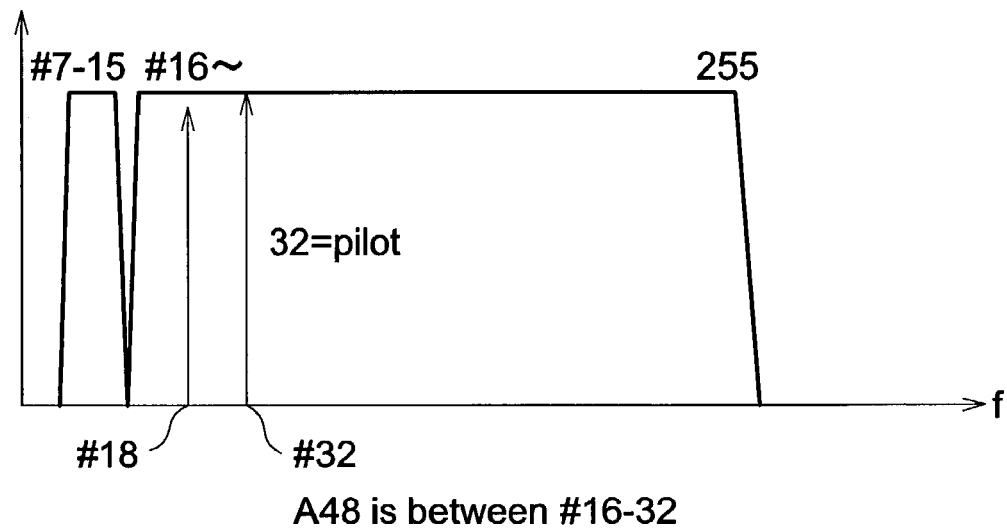

The following illustrates an original mode for the initialization sequence. As shown in FIG. 4(*a*), in the original mode regulated by G.dmt, carrier indexes #7-#31 are assigned to the upstream, and carrier indexes #32-#255 are assigned to the downstream. Especially, carrier indexes #48 and #64 are assigned to C-PILOT1A or C-PILOT1 signal. In the original mode as shown in FIG. 4(*b*), on the other hand, carrier indexes #7-#15 are assigned to the upstream, and carrier indexes #16-#255 are assigned to the downstream. Especially, carrier index #18 is assigned to a signal corresponding to A48 signal, and carrier index #16 or #32 is assigned to other PILOT signals.

FIGS. 5 and 6 illustrate a management table that indicates carrier allocations for the above described upstream and downstream. FIG. 5 illustrates a management table indicating carrier allocations in the normal mode, whereas FIG. 6 illustrates a management table indicating carrier allocations in the original mode.

In the original mode of the present embodiment, a usable band for the downstream is extended toward lower frequencies than that of the normal mode, limiting the usable band for the upstream. Accordingly, it is possible to assign a low frequency carrier to a PILOT signal included in the downstream. Therefore, it is possible to securely transmit a PILOT signal to the remote side even in a long distance communication. In case of a short distance, a higher quality communication can be provided.

Figure 7:
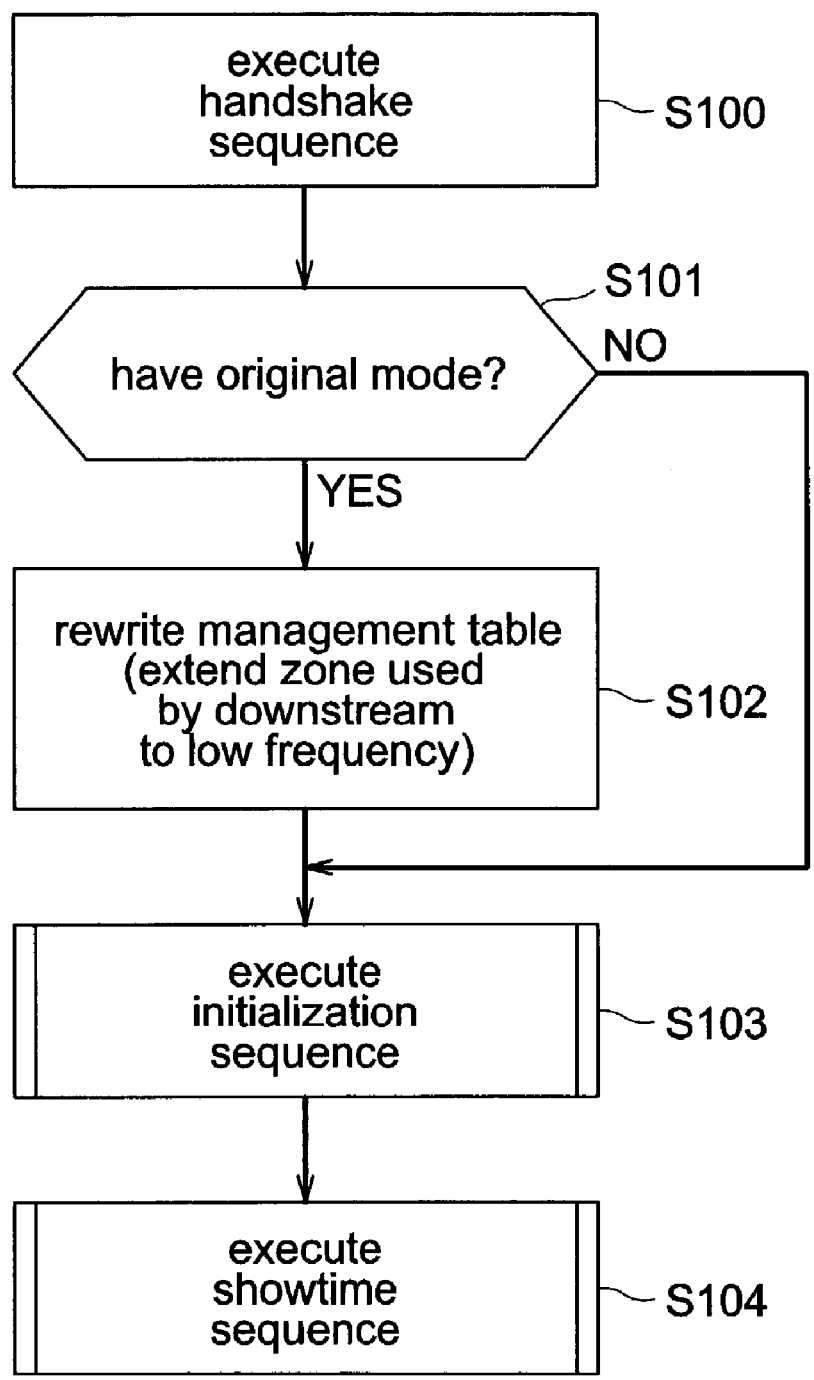
FIG. 7 is a flowchart illustrating a carrier extension process in the original mode according to the first embodiment of the present invention.

FIG. 7 is a flowchart illustrating a process to extend the downstream usable band to the low frequency side. Since the processes at the ATU-C and ATU-R sides are the same, no distinctions have been made for the illustration. The handshake sequence is executed between the ATU-C and ATU-R sides (step S100), in order to determine whether both sides support the original mode during the sequence (step S101). By employing a mode select signal, it is possible to determine whether the original mode is selected.

When both sides support the original mode, the management table of the normal mode set in default (FIG. 5) is rewritten to the management table of the original mode as illustrated in FIG. 6 (step S102).

Further, upon initiating the initialization sequence (step S103), the ATU-C transmits a PILOT signal using a carrier index that is assigned based on the management table of the original mode. Then, the ATU-R detects the PILOT signal using the carrier index assigned based on the management table of the original mode.

For example, the ATU-C transmits one of the C-PILOT1 signals (signal corresponding to A48 signal) using carrier index #18. With this method, the signal can reach a longer distance compared to transmitting the signal using carrier index #48 (in normal mode). Further, the ATU-C transmits another C-PILOT signal (signal corresponding to carrier index #64) using carrier index #32. Therefore, the signal can reach a longer distance compared to transmitting the signal using carrier index #64 (in normal mode). When the C-PILOT signal cannot reach the distance even with carrier index #32, carrier index #16 can be used. Accordingly, the ATU-R side can receive the PILOT signals, based on which the hyperframe synchronization is established.

Additionally, this invention is not limited to the above carrier index numbers to be assigned to PILOT signals. A carrier index number can be appropriately selected within the extended usable band of the downstream.

Upon completing the initialization sequence, the SHOW-TIME is executed for the data transmission (step S104).

According to the present embodiment, a usable band of the downstream in the original mode is extended toward lower frequencies than that of the normal mode, limiting the usable band of the upstream. Therefore, it is possible to assign a lower frequency carrier to a PILOT signal included in the downstream, thereby making it possible for the signal to securely reach the remote side even in a long distance. In case of a short distance, a higher quality communication can be provided.

Second Embodiment

The following illustrates a second embodiment of the present invention. In this embodiment, the upstream and downstream are time-division-multiplexed within one hyperframe period, in order to extend the downstream useable band toward the lower frequencies. The configuration of the ATU-C and ATU-R is the same as the first embodiment, except the handshake sequence of the original mode. Accordingly, in the second embodiment, parts having same numerical characters as in the first embodiment represent the same elements of the configuration as in the first embodiment.

Figure 8:
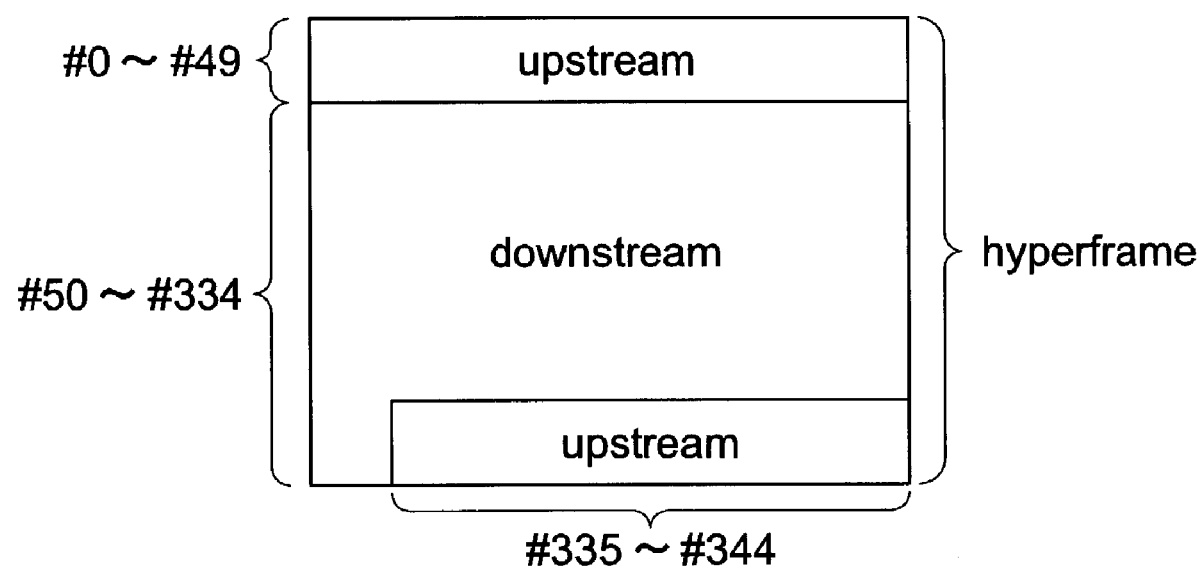
FIG. 8 illustrates a hyperframe that is time-division-multiplexed by the upstream and downstream in the original mode, according to a second embodiment of the present invention.

FIG. 8 illustrates a hyperframe in which the upstream and downstream are allocated by time-division-multiplexing. As shown in the figure, in the hyperframe, the $0^{th}$-$49^{th}$ symbols are allocated to the upstream, the $50^{th}$-$334^{th}$ symbols are allocated to the downstream, and the $335^{th}$-$344^{th}$ symbols (last 10 symbols) are again allocated to the upstream.

Figure 9:
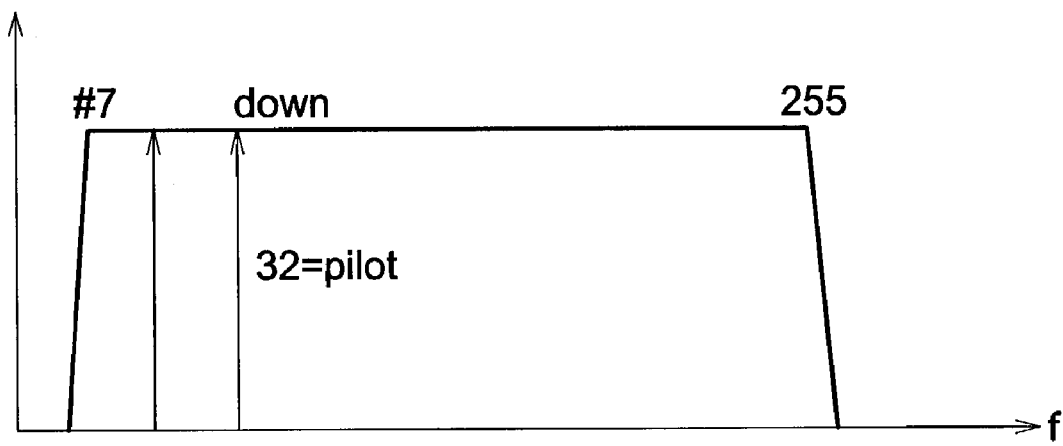
FIG. 9(a) illustrates a usable band for the downstream in the original mode, according to the second embodiment of the present invention.
FIG. 9(b) illustrates a usable band for the upstream in the original mode, according to the second embodiment of the present invention.
Figure 9:
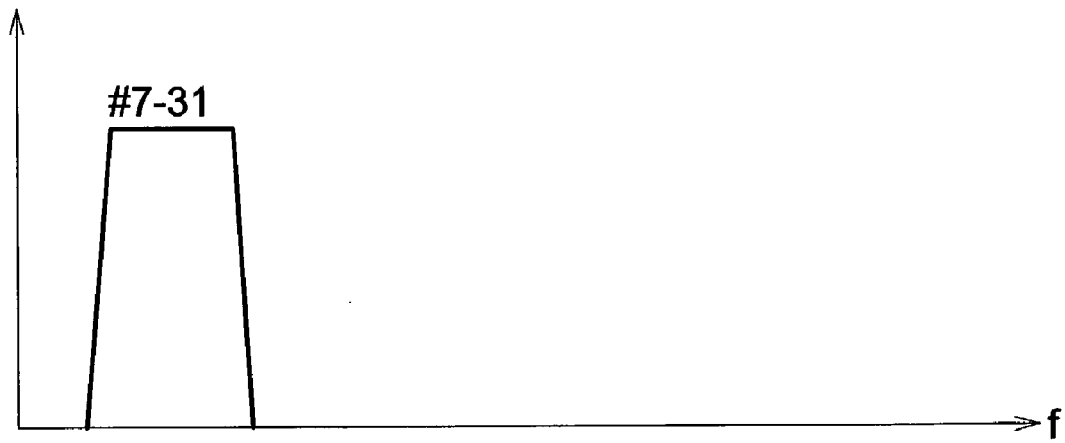

The frequency band usable for carriers in the downstream from carrier indexes #7-#255 as shown in FIG. 9(a). When the hyperframe is divided with frequencies into the upstream and downstream, the extension to the lower frequencies is very limited. However, by dividing the hyperframe with time-division-multiplexing, it is possible to extend to the lower frequencies down to carrier index #7.

The frequency band usable for carriers in the upstream is from carrier indexes #7-#31 as shown in FIG. 9(b). This is the same range as in the regulation set by G.dmt/G.lite.

The ATU-C and ATU-R maintain, in advance, a management table that manages usable carriers for the upstream and downstream in the above-described original mode. For example, the management table includes host 12 within the internal memory, and host 12 is provided to processor 20 for initiation. Or, host 12 can be stored in a ROM (not shown in figures) that is managed by processor 20.

FIG. 10 is a management table illustrating usable carriers for the upstream, in the original mode. FIG. 11 is a management table illustrating usable carriers for the downstream, in the original mode. "UP" illustrates a usable carrier for the upstream, and "DOWN" illustrates a usable carrier for the downstream.

The following illustrates a time-division-switching process of the upstream and downstream by the ATU-C and ATU-R. In this example, the original mode is employed for the initialization sequence, from a handshake sequence executed between the ATU-C and ATU-R.

First, the time-division-switching process of the upstream and downstream at the center side is illustrated. When the handshake sequence is initiated, the ATU-C transmits C-QUIET2 (silent period) for a plurality of symbols. Then, the ATU-C initiates a hyperframe transmission from "Beginning of Hyperframe" as in FIG. 3. The ATU-C has previously received a 400 Hz TTR clock from an exchange net. By synchronizing to the TTR clock, FEXT and NEXT periods of the hyperframe are distinguished as shown in FIG. 13.

The ATU-C counts a number of symbols from the beginning of the hyperframe. From the $0^{th}$-$49^{th}$ symbols, downstream signal transmission is stopped in order to receive upstream signals. Using the $50^{th}$-$334^{th}$ symbols, downstream signals are transmitted.

According to the management table of FIG. 11, the range from carrier indexes #7-#255 are used to transmit downstream signals. In this example, carrier index #32 is used for a signal corresponding to A48 signal of a C-PILOT signal, and carrier index #18 is used for another signal corresponding to carrier index #64. When the C-PILOT signal using carrier index #32 cannot reach the remote side because of attenuation, another carrier (e.g., carrier index #16) having a lower frequency is used for re-transmission.

Figure 12:
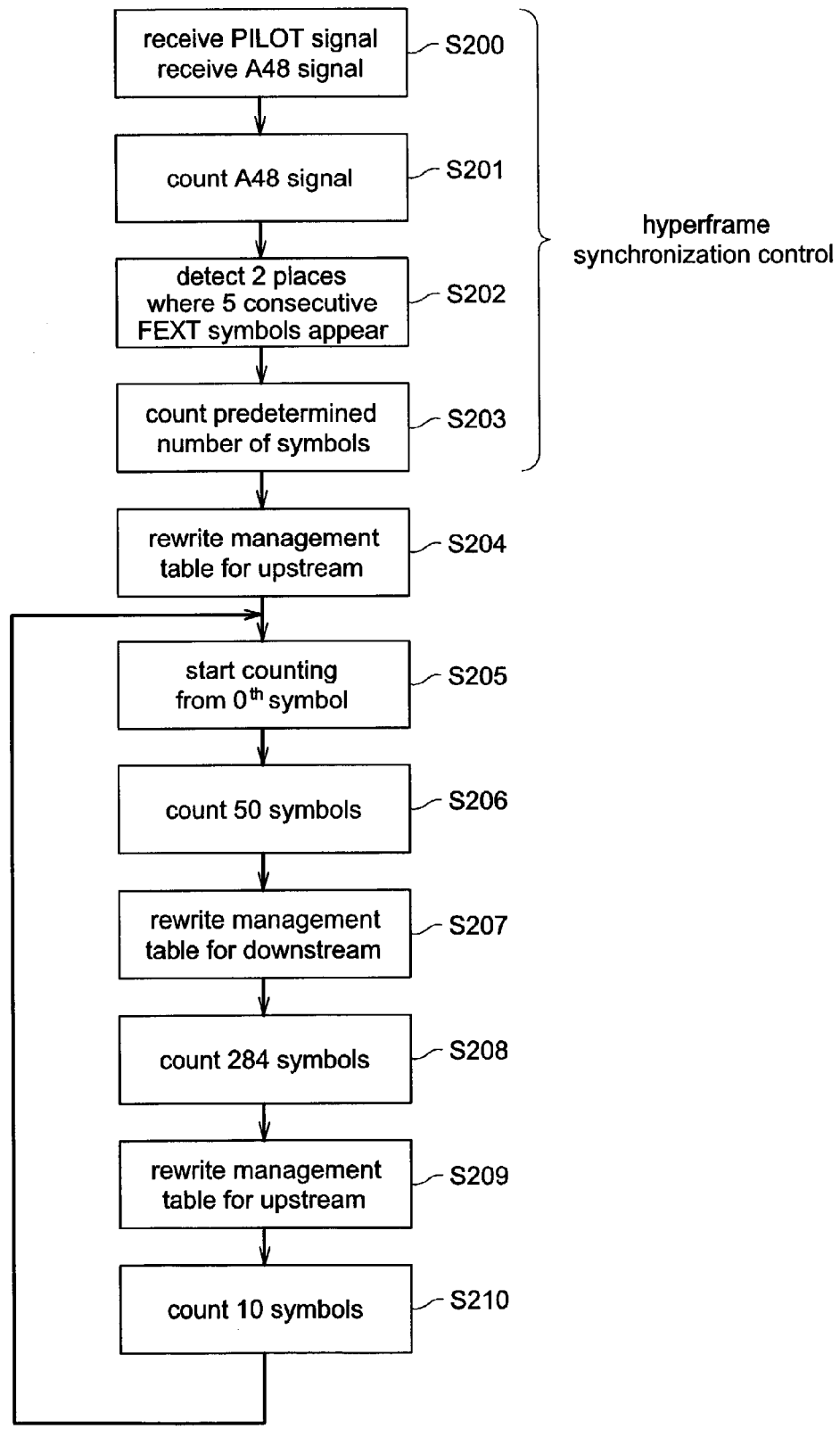
FIG. 12 is a flowchart of a time-division-multiplexing at the remote side in the original mode, according to the second embodiment of the present invention.

The ATU-R performs a time-division-switching of the upstream and downstream according to the flowchart shown in FIG. 12. When the initialization sequence is initiated, the ATU-R receives C-PILOT1 or C-PILOT1A signal (step S200). Prior to establishing the hyperframe synchronization, all carriers are constantly monitored. When energy of carrier indexes #32, #18, or #16 is detected, it is determined that a C-PILOT signal is received. Although the center side transmits the PILOT signal using the $50^{th}$-$334^{th}$ symbols of the hyperframe, the remote side waits for the reception expecting a full duplex communication, prior to establishing a hyperframe synchronization. Therefore, the PILOT signal can be securely received.

Next, based on the received PILOT signal, a boundary of FEXT and NEXT symbols are detected. Specifically, ANNEX. C generates a PILOT signal combining carrier indexes #64 and #48. During a FEXT period, the PILOT signal combining carrier indexes #64 and #48 with the same topology is transmitted, whereas, during a NEXT period, a PILOT signal of carrier index #64 and a PILOT signal of carrier index #48, having a topology shifted 90 degrees from the other PILOT signal, are transmitted. The remote side detects the change in the topology data of the PILOT signal, thereby locating a boundary from the FEXT to NEXT period. By recognizing the FEXT and NEXT symbols, a number of symbols are counted from the boundary (step S201). As shown in FIG. 13, 5 consecutive FEXT symbols appear at two locations, i.e., the $13^{th}$ sub-frame and the $22^{nd}$ sub-frame. When the ATU-R detects two locations of 5 consecutive FEXT symbols (step S202), symbols are counted from the following symbol (NEXT symbol), after the last FEXT symbol of the second 5 consecutive FEXT symbols, in order to recognize the very last symbol of the hyperframe (the $344^{th}$ symbol). By detecting the location of the last symbol of the hyperframe (or the location f the first symbol), it is possible to synchronize to the beginning of the hyperframe (step S203).

At the beginning of the hyperframe, the ATU-R rewrites the management table into what is shown in FIG. 10 (step S204). By counting a number of symbols from the $0^{th}$ symbol (step S205), 50 symbols are counted (step S206). From the $0^{th}$-$49^{th}$ symbols, upstream signals are transmitted as in the management table of FIG. 10.

Immediately before the $50^{th}$ symbol, the management table is rewritten to that of FIG. 11 (step S207), and 284 symbols from the $50^{th}$-$334^{th}$ symbols are counted (step S208). During this time, downstream signals are detected from carrier indexes #7-#255.

Further, by rewriting the management table for the upstream (step S209), 10 symbols are counted from the $335^{th}$-$344^{th}$ symbols (step S210) During this time, upstream signals are transmitted.

The above procedure illustrates the time-division-multiplexing of the upstream and downstream, which is switched at every hyperframe.

FIGS. 14(a), (b), (c) continuously illustrate the hyperframes in accordance with the initialization sequence. FIG. 14(a) illustrates the center side's transmission periods with un-shaded parts, while FIG. 14(b) illustrates the remote side's transmission periods with un-shaded parts. FIG. 14(c) is a combination of the hyperframes at the center and remote sides. As shown in the bottom of the sequence in FIG. 14(c), SEGUE signals are simultaneously transmitted during the initialization sequence. In this embodiment, the last sub-frame (the $31^{st}$ sub-frame) of the hyperframe is divided into two parts, the first half allocated to the downstream, and the second half, to the upstream.

Accordingly, the center side can transmit a C-SEGUE signal to the upstream and detect a R-SEGUE signal of the downstream. The remote side, conversely, can transmit the R-SEGUE signal to the downstream and detect the C-SEGUE signal of the upstream. Therefore, even though the upstream and downstream are time-division-multiplexed within one hyperframe, it is possible to securely transmit a SEGUE signal that is significant to the initialization sequence.

The last 10 symbols of the hyperframe are allocated to the upstream, whereas the first half of the last 20 symbols of the hyperframe are allocated to the downstream and the second half, to the upstream. Therefore, it is possible to continue the upstream allocated to the beginning of the next hyperframe, and to minimize the switching between the upstream and downstream.

The downstream and upstream allocated to the last sub-frame of the hyperframe can be at least one symbol. However, in consideration of the detection failure, this example uses a plurality of symbols.

Third Embodiment

The following describes a third embodiment of the present invention. The basic configurations of the ATU-C and ATU-R are the same as that of the first embodiment. Accordingly, in the third embodiment, parts having same numerical characters as in the first embodiment represent the same elements of the configuration as in the first embodiment.

In this embodiment, one hyperframe period is time-division-multiplexed with the upstream and downstream, extending the downstream usable band toward lower frequencies. In addition, the first 50 symbols of the hyperframe are allocated to the upstream, and the rest of the entire symbols are allocated to the downstream. Furthermore, since the transmission timing of a SEGUE signal overlaps with the last several symbols of the $N^{th}$ hyperframe, the SEGUE signal is first transmitted with the upstream allocated to the beginning of the hyperframe.

The present invention does not limit the number of symbols (to be allocated to the upstream) to 50 symbols. The number of symbols can be appropriately determined in relations to data amount to be transmitted to the downstream.

Figure 15:
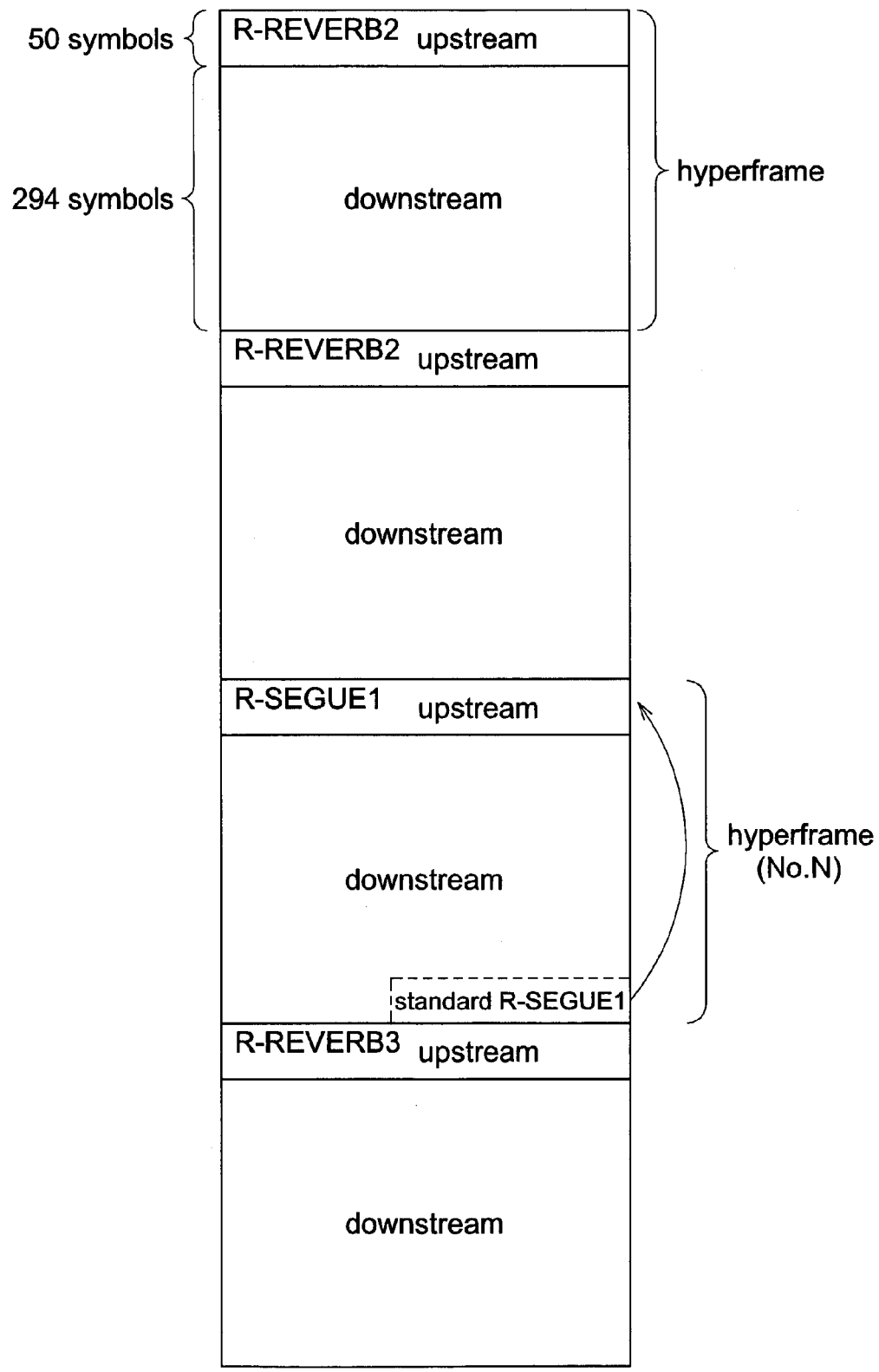
FIG. 15 illustrates a time-division-multiplexing of the upstream and downstream, according to a third embodiment of the present invention.

FIG. 15 illustrates a state where a time-division-multiplexing is performed with the upstream and downstream, having the upstream transmit R-REVERB2 signals. As shown in FIG. 3, ANNEX.C specification of G.dmt sets the number of symbols for the R-REVERB2 from 3634 to 3643. Furthermore, the specification presets the number of hyperframes to be transmitted from the beginning of a hyperframe transmission to the end of R-SEGUE1, "Introduction of guard time". In this embodiment, the number of hyperframes is set as "N". When ANNEX.C of G.dmt is applied, R-SEGUE1 is transmitted from the beginning of the hyperframe transmission to the last several symbol of the $N^{th}$ hyperframe. However, as shown in FIG. 15, R-SEGUE1 of the upstream cannot be transmitted because the last several symbols of the hyperframe are allocated to the downstream.

Accordingly, in this embodiment, R-SEGUE1 to be transmitted with the last several symbols of the $N^{th}$ hyperframe are transmitted with the upstream that is allocated to the first several symbols of the $N^{th}$ hyperframe. The center side also waits for R-REVERB1 transmission with the upstream allocated to the first several symbols of the $N^{th}$ hyperframe in the original mode.

The above-described pre-sending process of the SEGUE signal at the remote side is applied not only to R-SEGUE1 but to other SEGUE signals (e.g., R-SEGUE2).

However, since ANNEX.C of G.dmt sets R-REVERB4 to be transmitted for 296 symbols, the transmission of R-REVERB4 is completed with one hyperframe, which is configured with 345 symbols. Thus, the transmission timing of the SEGUE signal cannot be shifted from the end of the hyperframe to the beginning of the hyperframe.

Accordingly, R-REVERB4 is transmitted using the last half of the R-MEDLEY transmission period (prior to R-REVERB4 transmission), so that R-REVERB4 is transmitted with at least two hyperframes.

Since ANNEX.C of G.dmt sets 296 symbols for R-REVERB4, and 13 symbols for R-SEGUE3, {345−(296+13)+345}=481 symbols of the second half of the R-MEDLEY are used for the R-REVERB4 transmission. At the remote side, a number of hyperframes is counted from the beginning of R-REVERB4 transmission ($481^{st}$ symbols counting backwards from the end of R-MEDLEY), which is beginning of the hyperframe. At the second hyperframe front-end (upstream), R-SEGUE3 is transmitted. The center side, on the other hand, counts the number of hyperframes from the beginning of the R-REVERB4 reception, and receives R-SEGUE3 with the upstream allocated to the beginning of the second hyperframe.

The following illustrates the initialization sequence in detail. When the original mode is selected as the initialization sequence from the handshake sequence, the remote side establishes a hyperframe synchronization based on a C-PILOT upon initiating the initialization sequence. When the center side starts a hyperframe transmission, the synchronization can be established at the last symbol of the first hyperframe. Therefore, the number of hyperframes is counted from that point.

Figure 16:
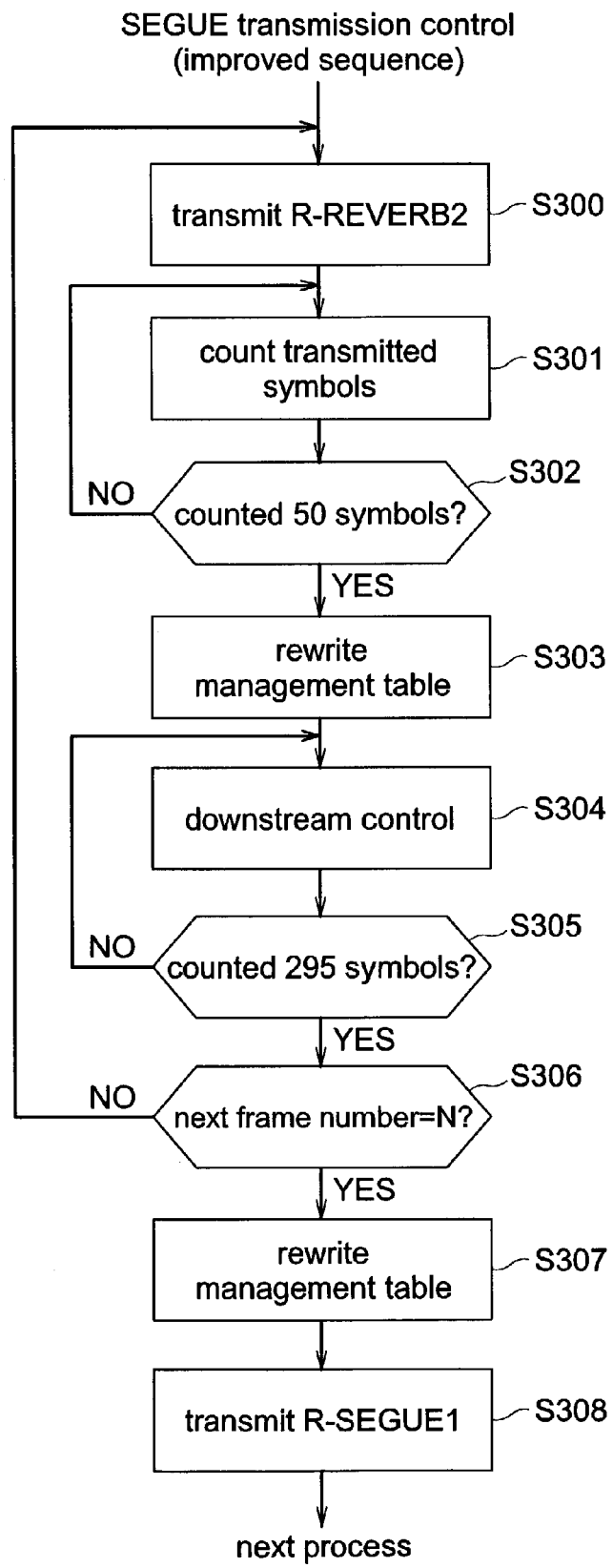
FIG. 16 is a flowchart illustrating a procedure until a SEGUE signal is transmitted from the remote side, according to the third embodiment of the present invention.

The following example illustrates the sequence from the beginning of R-REVERB2 during the initialization sequence. FIG. 16 illustrates a process after the ATU-R starts the R-REVERB2 transmission. The R-REVERB2 transmission starts from the $0^{th}$ symbol of the hyperframe (step S300). For the upstream transmission, a carrier is selected based on the management table illustrated in FIG. 10. Upon counting the number of symbols transmitted with the upstream (step S301) and transmitting R-REVERB2 for 50 symbols (step S302), the data is switched to the downstream side (step S303). Therefore, the management table is rewritten to what is shown in FIG. 11 in order to change the carriers to be used (step S303). According to the management table of FIG. 11, signal energy of carrier indexes #7-#255 is monitored, and the downstream signals are received (step S304). The number of symbols is counted since switching to the downstream, in order to determine whether the symbol number of the hyperframe indicates the last symbol (step S305).

When the hyperframe is switched to a new hyperframe, it is checked whether the frame number of the next hyperframe is N (step S306). When the next hyperframe is the $3^{rd}$ hyperframe from the beginning as in FIG. 15, R-SEGUE1 signal needs to be transmitted with the upstream.

When the next frame number=N at step S306, the management table is rewritten to that of FIG. 10 (step S307), and R-SEGUE1 symbol is transmitted between the $0^{th}$ and $49^{th}$ symbols (step S308).

Accordingly, the remote side can transmit R-SEGUE1 signal at a timing shifted from the original transmission timing. The center side can also receive the signal at a different timing from the original timing.

Fourth Embodiment

The following illustrates a fourth embodiment of the present invention. The basic configurations of the ATU-C and ATU-R are the same as that of the first embodiment. Accordingly, in the fourth embodiment, parts having same numerical characters as in the first embodiment represent the same elements of the configuration as in the first embodiment.

In this embodiment, one hyperframe period is time-division-multiplexed with the upstream and downstream, extending the downstream usable band toward lower frequencies during the SHOWTIME (data transmission period) as shown in FIG. 15.

Figure 17:
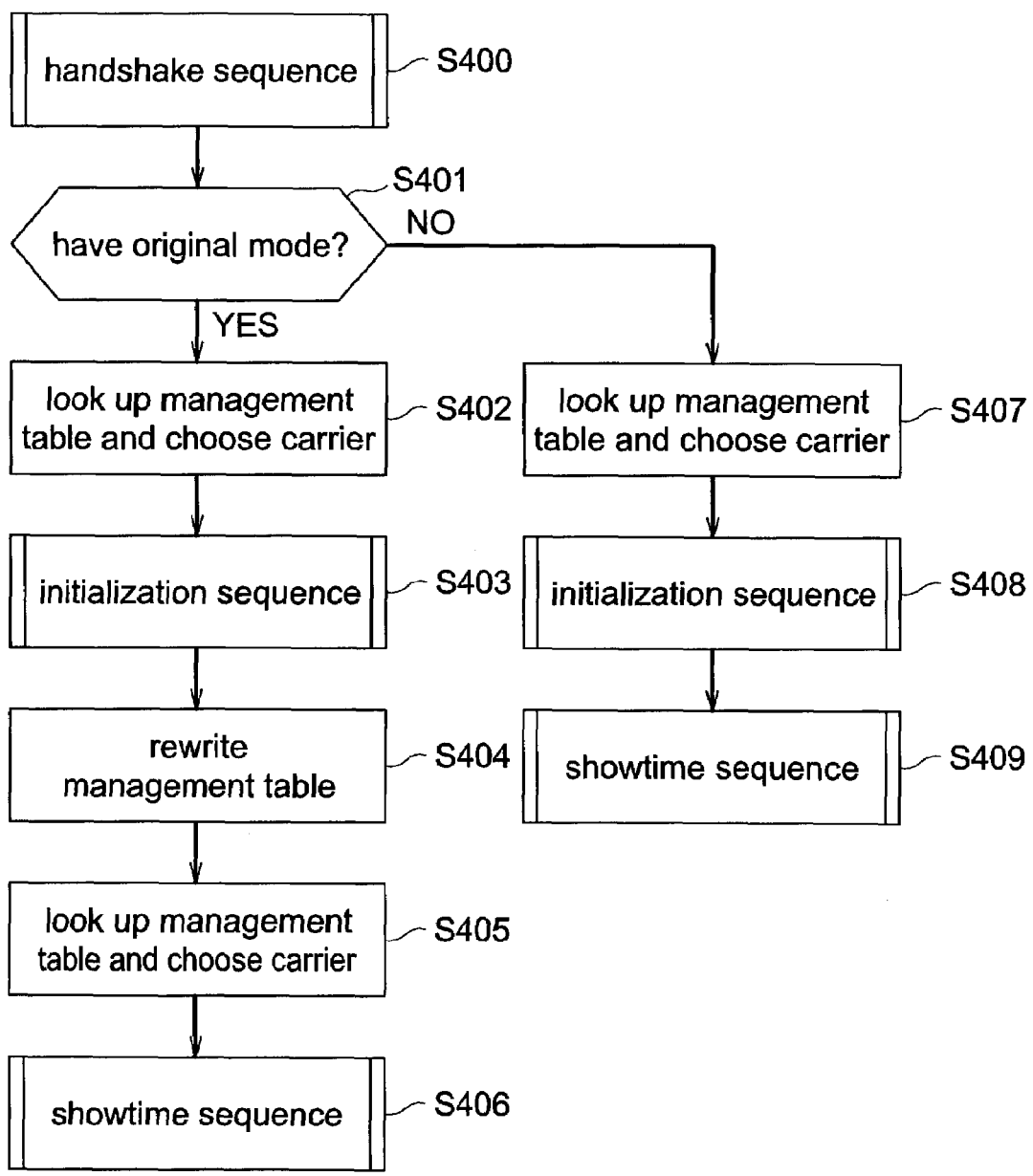
FIG. 17 is a flowchart for a time-division-multiplexing, according to a fourth embodiment of the present invention.

FIG. 17 is a flowchart illustrating the time-division-multiplexing with the upstream and downstream during the SHOWTIME. Since the processes at the ATU-C and ATU-R sides are the same, no distinctions have been made for the illustration.

When it is determined that the original mode is used for the initialization sequence, from the handshake sequence (steps S400 and S401), carriers are selected according to the management table of FIG. 5, which is a default management table, in order to execute the initialization sequence (steps S402 and S403).

When the initialization sequence is completed, the time-division-multiplexing process for one hyperframe period, with upstream and downstream, is initiated. In this example, similar to that of FIG. 15, the $0^{th}$-$49^{th}$ symbols are allocated to the upstream of the hyperframe, and the $50^{th}$-$344^{th}$ symbols are allocated to the downstream. It is noted that this invention is not limited to the above symbol number allocation method.

By rewriting the carriers to be used for the upstream into the management table shown in FIG. 10 (step S404), carriers are selected based on the management table of FIG. 10 (step S405). Upon initiating the SHOWTIME, the remote side transmits data by using the $0^{th}$-$49^{th}$ symbols during the upstream period of the hyperframe (step S406). The carriers used for this data transmission are carrier indexes #0-#31. The center side refers to the management table of FIG. 10, and monitors signal energy of carrier indexes #0-#31.

At the $50^{th}$ symbol of the hyperframe, the stream is switched from upstream to downstream. Accordingly, both center and remote sides switches the management table into that of downstream shown in FIG. 11. The center side uses carrier indexes #7-#255 to transmit downstream data during the $50^{th}$-$344^{th}$ symbols of the hyperframe. The remote side refers to the management table of FIG. 11 and monitors signal energy of carrier indexes #7-#255.

Thereafter, the number of symbols of the hyperframe is counted, and the stream is switched between the upstream and downstream. By switching the management table between the upstream and downstream, usable carriers are employed for the data transmission.

When the normal mode is selected during the handshake sequence, the control moves to step S407, where usable carriers are recognized based on the default management table of FIG. 5, and signals are exchanged using the recognized carriers during the initialization sequence (step S408). Upon completing the initialization sequence, the SHOWTIME is executed (step S409).

Since data amount of the upstream is basically less than that of downstream, fewer symbols (50 symbols) are allocated to the upstream. Situations can occur where upstream data is generated (e.g., user data input) during the downstream at the ATU-R side, thereby making it impossible to transmit the generated upstream data during the downstream period.

Figure 18:
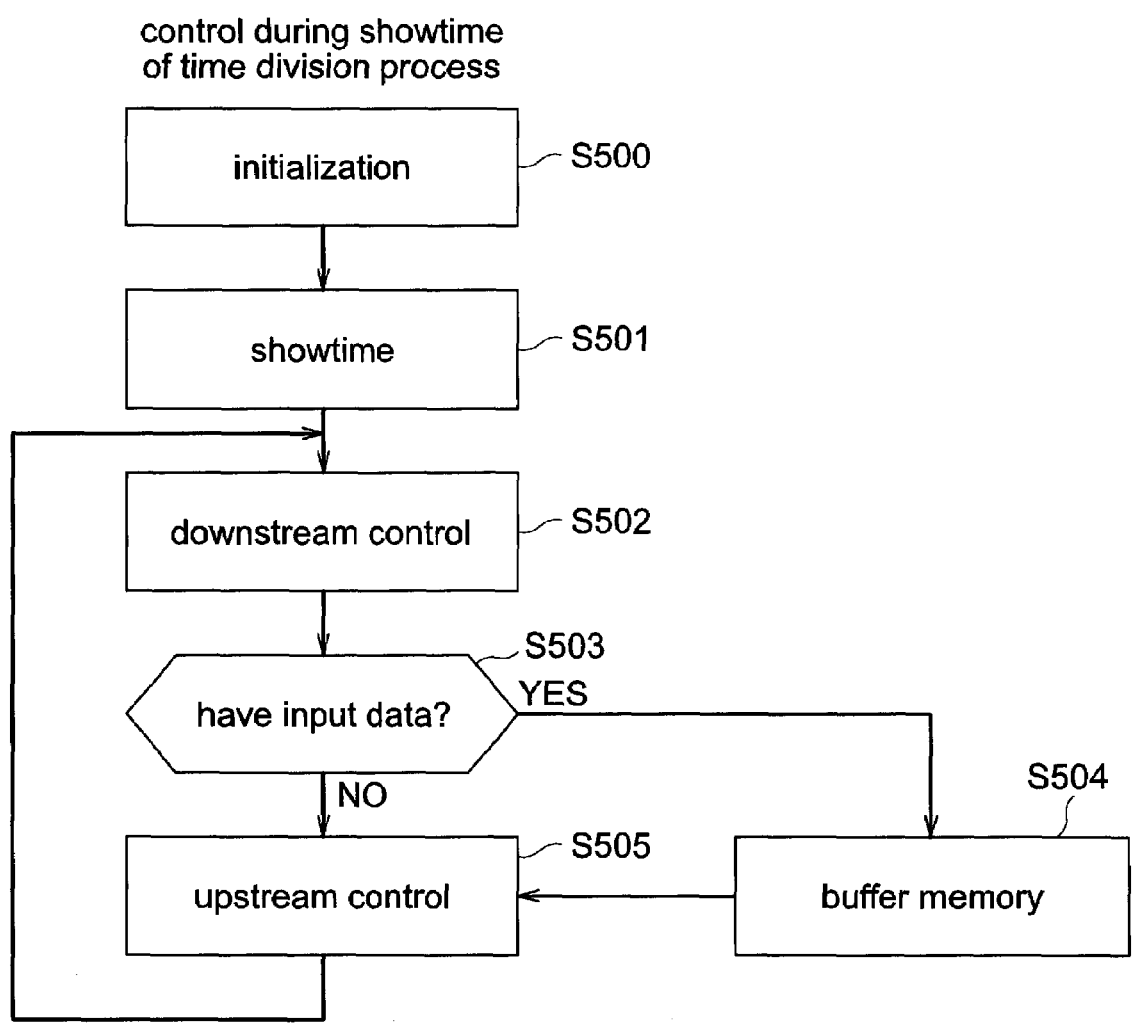
FIG. 18 illustrates a buffering process of upstream data, according to the fourth embodiment of the present invention.

Therefore, as illustrated in FIG. 18, when such upstream data is generated (e.g., user data input) during the downstream period, the data is buffered to be transmitted during the next upstream period.

Upon executing the initialization at ATU-R (step S500), the SHOWTIME is executed (step S501). With the timing shown in FIG. 15, one hyperframe period is time-division-multiplexed with the upstream and downstream. During the downstream period (step S502), when input data to be transmitted with an upstream (step S503), the data is stored in buffer memory 12a (step S504) to be kept until the next upstream period. When it is time for the next upstream, the data is retrieved from buffer memory 12a and transmitted to the center side (step S505).

It is preferable to use a memory managed by host 12 as buffer memory 12a.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2002-226537 filed on Aug. 2, 2002, entire content of which is expressly incorporated by reference herein.

What is claimed is:

1. An ADSL modem apparatus on a center side that is connected to another ADSL modem apparatus on a remote side, the ADSL modem apparatus on the center side transmitting signals to the ADSL modem on the remote side in a downstream, the ADSL modem apparatus on the remote side transmitting signals to the ADSL modem apparatus on the center side in an upstream, the ADSL modem on the center side comprising:
   a memory that stores a carrier table for a normal mode that shows that carriers #7 to #31 are assigned to the upstream and carriers #32 to #255 are assigned to the downstream;
   a handshaker that performs a handshake sequence with the ADSL modem apparatus on the remote side;
   a determiner that determines whether the ADSL modem apparatus on the remote side supports an original mode, in which some carriers lower than carrier #32 are assigned to the downstream;
   a rewriter that rewrites the carrier table from the normal mode to the original mode when the determiner determines that the ADSL modem apparatus on the remote side supports the original mode; and
   an initializer that performs an initialization sequence with the ADSL modem apparatus on the remote side, using carriers that the carrier table, rewritten by the rewriter, shows are assigned to the downstream, the initializer transmitting a PILOT signal to the ADSL modem apparatus on the remote side using the carrier #32 or lower.

2. The ADSL modem apparatus of claim 1, wherein the carrier the initializer uses to transmit the PILOT signal is the carrier #16, #18 or #32.

3. An ADSL modem communication method to be performed in an ADSL modem apparatus on a center side that is connected to another ADSL modem apparatus on a remote side, the ADSL modem apparatus on the center side transmitting signals to the ADSL modem on the remote side in a downstream, the ADSL modem apparatus on the remote side transmitting signals to the ADSL modem apparatus on the center side in an upstream, the ADSL modem communication method comprising:
   storing, in a memory, a carrier table for a normal mode that shows that carriers #7 to #31 are assigned to the upstream and carriers #32 to #255 are assigned to the downstream;
   performing a handshaking sequence with the ADSL modem apparatus on the remote side;
   determining whether the ADSL modem apparatus on the remote side supports an original mode, in which some carriers lower than carrier #32 are assigned to the downstream;
   rewriting the carrier table from the normal mode to the original mode when the ADSL modem apparatus on the remote side is determined to support the original mode; and
   performing an initialization sequence with the ADSL modem apparatus on the remote side, using carriers that the rewritten carrier table shows are assigned to the downstream, transmitting a PILOT signal to the ADSL modem apparatus on the remote side, using the carrier #32 or lower.

4. An ADSL modem apparatus on a center side that is connected to another ADSL modem apparatus on a remote side, the ADSL modem apparatus on the center side transmitting signals to the ADSL modem on the remote side in a downstream, the ADSL modem apparatus on the remote side transmitting signals to the ADSL modem apparatus on the center side in an upstream, the ADSL modem on the center side comprising:
   a memory that stores a carrier table showing whether each of carriers #0-#255 is for the downstream;
   a transmitter that transmit a signal to the ADSL modem apparatus on the remote side in the downstream, using a carrier that the carrier table stored in the memory shows is for the downstream;
   a rewriter that rewrites the carrier table stored in the memory so that some carriers lower than carrier #32 are for the downstream; and
   wherein the transmitter transmits the signal to the ADSL modem apparatus on the remote side in the downstream, using a carrier that the carrier table rewritten by the rewriter shows is for the downstream and is the carrier #16, #18 or #32.

5. An ADSL modem communication method performed by an ADSL modem apparatus on a center side connected to another ADSL modem apparatus on a remote side, the ADSL modem communication method comprising:
   having a carrier table for a normal mode in which carriers below #32 are assigned to an upstream and carriers at least equal to #32 are assigned to a downstream;
   performing a handshaking sequence with the ADSL modem apparatus on the remote side to determine whether the ADSL modem apparatus on the remote side supports an original mode;
   revising the carrier table to assign carriers lower than carrier #32 to the downstream when it is determined that the ADSL modem apparatus on the remote side supports the original mode; and
   performing an initialization sequence with the ADSL modem apparatus on the remote side, using carriers that the rewritten carrier table shows are assigned to the downstream, transmitting a PILOT signal to the ADSL modem apparatus on the remote side using the carriers #32 or lower.

* * * * *